US012134205B2

(12) United States Patent
Whelan et al.

(10) Patent No.: US 12,134,205 B2
(45) Date of Patent: Nov. 5, 2024

(54) SMART DIE OUTPUT LANE ASSEMBLY

(71) Applicant: NAS Nalle Automation Systems, LLC, Knoxville, TN (US)

(72) Inventors: David J. Whelan, Knoxville, TN (US); Ryan C. Whelan, Knoxville, TN (US)

(73) Assignee: BROWN LLC, Beaverton, MI (US)

( * ) Notice: Subject to any disclaimer, the term of this patent is extended or adjusted under 35 U.S.C. 154(b) by 443 days.

(21) Appl. No.: 17/018,706

(22) Filed: Sep. 11, 2020

(65) Prior Publication Data

US 2022/0080612 A1 Mar. 17, 2022

(51) Int. Cl.

| | |
|---|---|
| ***B26D 7/18*** | (2006.01) |
| ***B26D 5/00*** | (2006.01) |
| ***B26D 7/00*** | (2006.01) |
| ***B26F 1/44*** | (2006.01) |

(52) U.S. Cl.
CPC ........... *B26D 7/1818* (2013.01); *B26D 5/005* (2013.01); *B26F 1/44* (2013.01); *B26D 2007/0018* (2013.01); *B26F 2001/4463* (2013.01)

(58) Field of Classification Search
CPC ......... B26D 7/0006; B21D 37/10; B26F 1/40; B65G 47/905; B65G 47/681; B25J 19/02
See application file for complete search history.

(56) References Cited

U.S. PATENT DOCUMENTS

| | | | | |
|---|---|---|---|---|
| 4,692,876 A | | 9/1987 | Tenma et al. | |
| 5,087,169 A | | 2/1992 | Tuebke | |
| 5,784,542 A | * | 7/1998 | Ohm | A61B 34/35 901/34 |
| 6,046,676 A | * | 4/2000 | Ward | G06K 19/0723 340/572.1 |
| 7,006,891 B2 | | 2/2006 | Roth et al. | |
| 7,210,894 B2 | | 5/2007 | Huang et al. | |
| 7,266,422 B1 | | 9/2007 | Demotte et al. | |

(Continued)

FOREIGN PATENT DOCUMENTS

| | | |
|---|---|---|
| CN | 210100082 | 2/2020 |
| CN | 210100832 | 2/2020 |

(Continued)

OTHER PUBLICATIONS

Paper Machinery Corporation, "PMC HS-800 High Speed Die Cutting Machine Video," Feb. 2013, Min 0-4:13, (Year: 2013).*

(Continued)

*Primary Examiner* — Jonathan G Riley
(74) *Attorney, Agent, or Firm* — HOVEY WILLIAMS LLP

(57) ABSTRACT

A die output lane assembly for receiving a blank through an opening of a die-cutter machine includes a frame, a support structure, and a memory device. The support structure is attached to the frame to form a lane and is configured to receive the blank from the opening of the die-cutter machine and temporarily store the blank in the lane. The memory device is configured to store data associated with the die output lane assembly thereon. The data includes at least one of a dimension of the die output lane assembly, a dimension of a cutting die of the die-cutter machine, a dimension of the blank, a pick position for removing the blank, a retraction path for removing the blank, a speed of part handling, or placement position data for storing the blank.

3 Claims, 11 Drawing Sheets

(56) References Cited

U.S. PATENT DOCUMENTS

| | | | | |
|---|---|---|---|---|
| 7,450,008 | B2 * | 11/2008 | Erickson | G06K 7/0008 340/572.1 |
| 8,000,837 | B2 | 8/2011 | Allen et al. | |
| 9,682,481 | B2 | 6/2017 | Lutz et al. | |
| 2003/0005665 | A1 * | 1/2003 | Wipf | B65B 35/58 53/550 |
| 2015/0277426 | A1 * | 10/2015 | Ogata | B25J 9/1694 901/46 |
| 2016/0203232 | A1 * | 7/2016 | O'Brien | B29C 33/70 235/375 |
| 2019/0176348 | A1 * | 6/2019 | Bingham | B25J 9/1697 |

FOREIGN PATENT DOCUMENTS

| | | | |
|---|---|---|---|
| EP | 2857187 | 4/2015 | |
| JP | 05-238557 | 9/1993 | |
| JP | H05246172 A * | 9/1994 | |
| KR | 10-0132752 | 4/1998 | |
| KR | 10-1590059 | 1/2016 | |
| WO | WO-2010023795 A1 * | 3/2010 | B25J 9/1687 |

OTHER PUBLICATIONS

Amsler, Sarah, RFID (radio frequency identification), techtarget.com, available on Aug. 29, 2023 at : https://www.techtarget.com/iotagenda/definition/RFID-radio-frequency-identification#:~:text=Low%2Dpower%2C%20embedded%20non%2D,reader%20or%20existing%20data%20overwritten.*

Brown Machine Group Regular DOLAs webpage: https://brownmachinegroup.com/machine/axatronics-c-rush-system/.

International Search Report an Written Opinion mailed Jul. 28, 2021 for PCT application No. PCT/US2021/027176, filed Apr. 14, 2021.

* cited by examiner

SMART DIE OUTPUT LANE ASSEMBLY

BACKGROUND

Manufacturers of paper products, such as paper cups, often use high-speed, vertical die-cutter machines to create flat blanks, such as paper cup sidewalls that are subsequently assembled to form the products. The blanks are often die-cut from large rolls of coated paper into the exact size and shape required. The high-speed die-cutter machines often have multiple cavity-dies to create multiple flat blanks per stroke. Such high-speed die-cutter machines often operate at 350 to 425 stokes per minute. There are hundreds of types of cutting dies for producing a variety of paper products used in, for example, the disposable food container industry.

As die-cutter machines continuously run, the blanks are quickly pushed out the fronts of the cutting dies, forming horizontal rows of blanks. Many different mechanical approaches have been used over the years to support the rows of blanks departing the cutting dies. Most often, die-cutter machines have simple horizontal rods attached to the faces of their cutting dies to catch each row of blanks. However, these solutions cause a multitude of problems.

The background discussion is intended to provide information related to the present invention which is not necessarily prior art.

SUMMARY

The present invention solves the above-described problems and other problems and provides a distinct advance in the art of manufacturing paper products. More particularly, embodiments of the present invention provide methods and systems for handling blanks from a die-cutter machine.

A die output lane assembly according to an embodiment of the present invention may be installed on a die-cutter machine and broadly comprises a frame, a support structure attached to the frame, and a memory device. The support structure forms a lane and is configured to receive a blank from an opening of the die-cutter machine and temporarily store the blank in the lane.

The memory device is configured to store data associated with the die output lane assembly thereon. The data includes at least one of a dimension of the die output lane assembly, a dimension of a cutting die of the die-cutter machine, a dimension of the blank, a pick position for removing the blank, a retraction path for removing the blank, a speed of part handling, or placement position data for storing the blank. The memory device with the data associated with the die output lane assembly allows the die output lane assembly to be quickly installed and its associated data distributed to relevant controllers, enabling immediate use without having to select and/or input new recipe data.

Another embodiment of the invention is a method for installing a die output lane assembly. The method comprises securing the die output lane assembly adjacent to a cutting die of a die-cutter machine; and transmitting data associated with the die output lane assembly from a memory device on the die output lane assembly to a controller.

Another embodiment of the invention is a system for producing sidewalls of paper cups from a web. The system comprises a die-cutter machine, a die output lane assembly, a sidewall removal device, and a controller. The die-cutter machine comprises a cutting die and a punch. The cutting die includes a plurality of openings for forming the sidewalls.

The punch is configured to press the web against the cutting die and push the sidewalls formed therein out of the openings.

The die output lane assembly comprises a frame, a plurality of support structures, and a memory device. The support structures are attached to the frame to form a plurality of lanes. The support structures are operable to receive the sidewalls from the openings of the cutting die. The memory device is configured to store data associated with the die output lane assembly thereon.

The sidewall removal device is configured to remove the sidewalls from the die output lane assembly. The controller is configured to use the data associated with the die output lane assembly to direct the sidewall removal device to remove the sidewalls from the die output lane assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
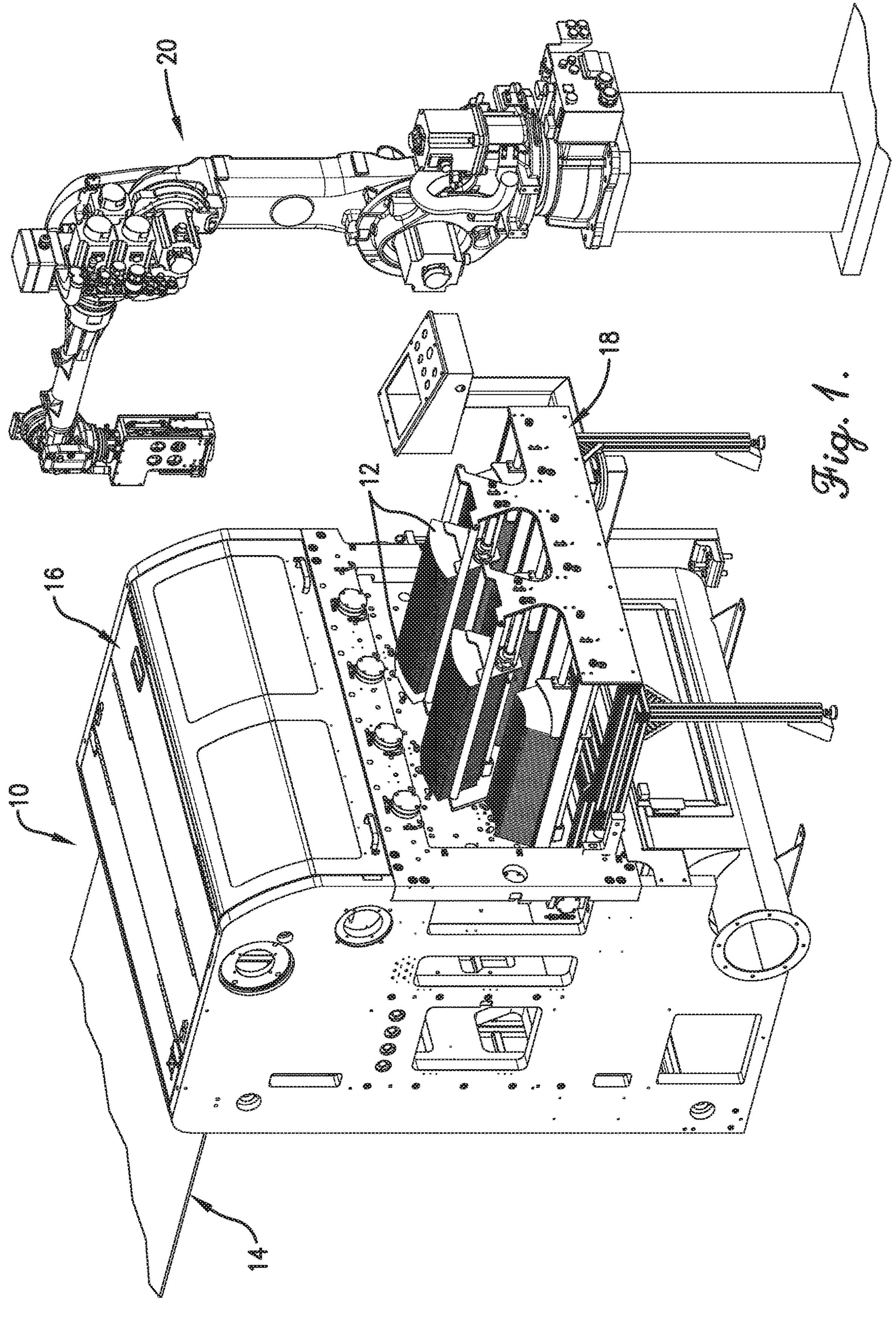
FIG. 1 is a perspective view of an exemplary system for forming blanks according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Die-cutter machines are used to form parts of disposable products and often have cutting dies used to form the parts, or blanks. The machines often have simple horizontal rods attached to the faces of their cutting dies to catch rows of blanks. These horizontal rods eventually fill up with the blanks if the blanks are not removed fast enough. However, it is often difficult to remove the blanks as fast as the die-cutter machines operate. One solution for unloading blanks involves using a blank removal device, such as a six-axis robot, with a specialized end-of-arm-tool (EOAT) to grip a reproducible, specific length or stack of blanks from a row. The gripped stack of blanks is held by the EOAT as the EOAT turns the stack horizontally and places it neatly in specific, engineered patterns into carts or large gaylords for work-in-progress storage.

To automate the process of unloading blanks, the exiting blanks need to be maintained in a repeatable, consistent alignment. A mechanical fixture, such as a die-cutter output lane assembly ("DOLA"), according to an embodiment of the present invention is configured to hold the exiting blanks. Every different cup size or shape requires a different cutting die and a different DOLA. One manufacturing facility can easily have more than 30 different die-sets, therefore requiring over 30 different DOLAs.

There are major challenges presented by the use of numerous DOLAs. First, when a blank removal device needs to pick or remove parts from a DOLA, the positioning of the blank removal device must also be changed in order for it to extract from the different sized DOLAs. This is accomplished through a set of data, or "recipe." The recipe comprises program variables associated with a DOLA necessary for the robotic process. The recipe may include pick positions, retraction paths, speed of part handling, placement position data associated with the tote or Gaylord to match the needed stacking configuration per cup shape and size, etc. The recipe often includes more than forty (40) different variables associated with any and every single DOLA. In current solutions, these variables are preprogrammed initially and stored in a blank removal device controller.

However, this presents additional issues. One such issue is that the blank removal device controller memory is limited, which means its memory cannot handle multiple DOLAs, which is often required by most manufacturers. Further, each time a new cup shape/size is needed, a new die-set as well as a new DOLA must be installed. This requires highly skilled personnel to connect to the blank removal device controller and load the new recipe for the new DOLA. Programming time to load new recipes is substantial, requiring specialized expertise typically not found within the employees of many manufacturers.

Another challenge arises whenever an output lane of a DOLA becomes full. When any lane of a DOLA is full, the die-cutter machine must stop entirely. This safety measure requires a machine operator to then restart the die-cutter machine manually once the issue that caused the full lane is resolved. During the course of normal manufacturing, there are many reasons why a blank removal device could be prevented from servicing a DOLA during production. This can occur on a fairly regular basis depending upon the skill level and attentiveness of the machine operating staff. However, restarting the machine is a lengthy process that is costly in terms of labor and loss of production.

Embodiments of the present invention solve the above described problems and other problems by providing systems for producing blanks and methods for installing such systems. Turning to FIG. 1, an exemplary system 10 constructed in accordance with an embodiment of the invention is depicted. The system 10 is operable to produce blanks 12 from a web 14. The blanks 12 may comprise, for example, sidewalls of paper cups, and the web 14 may comprise any material, such as paper or coated paper.

Figure 2:
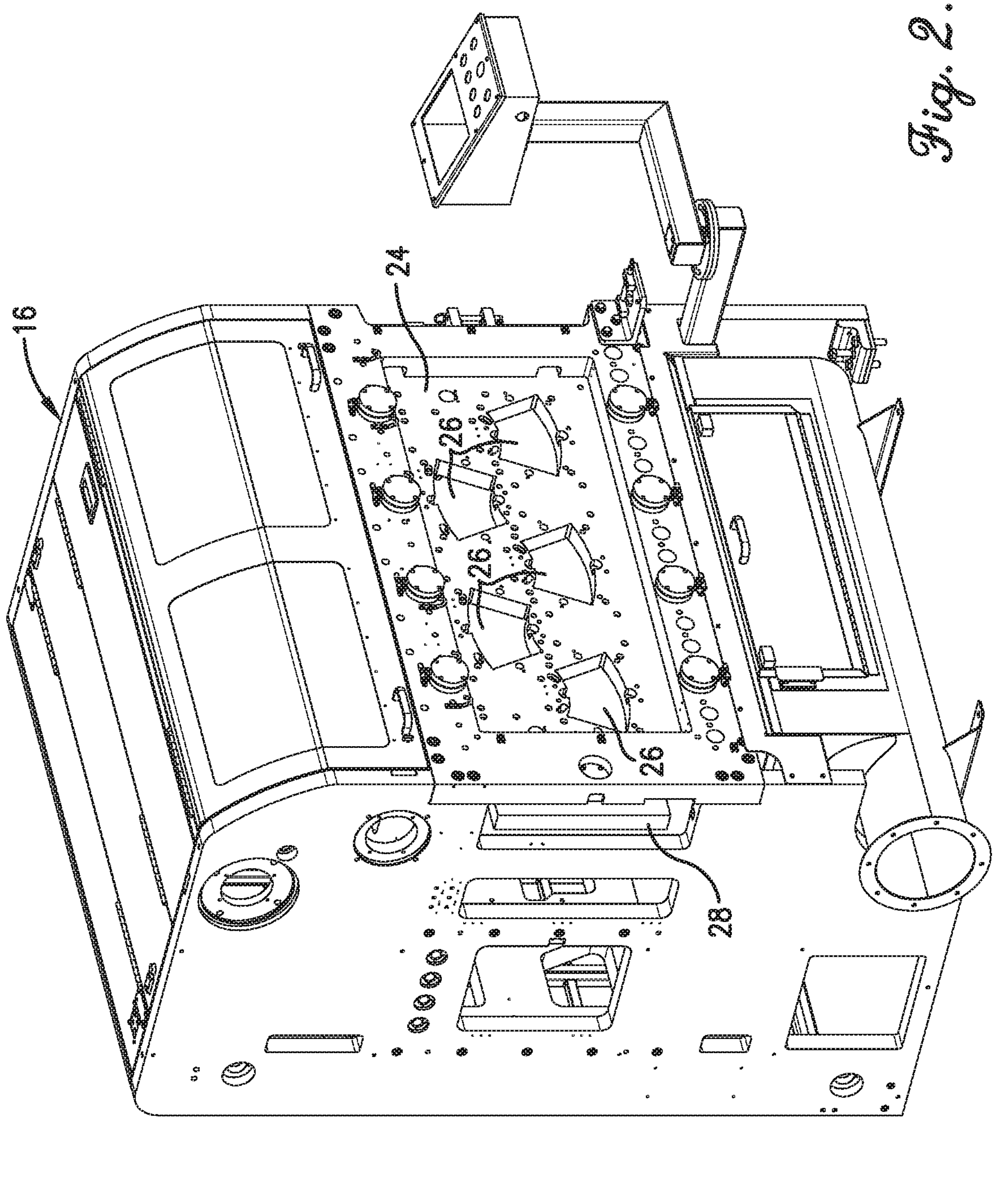
FIG. 2 is a perspective view of a die-cutter machine of the system of FIG. 1.
Figure 3:
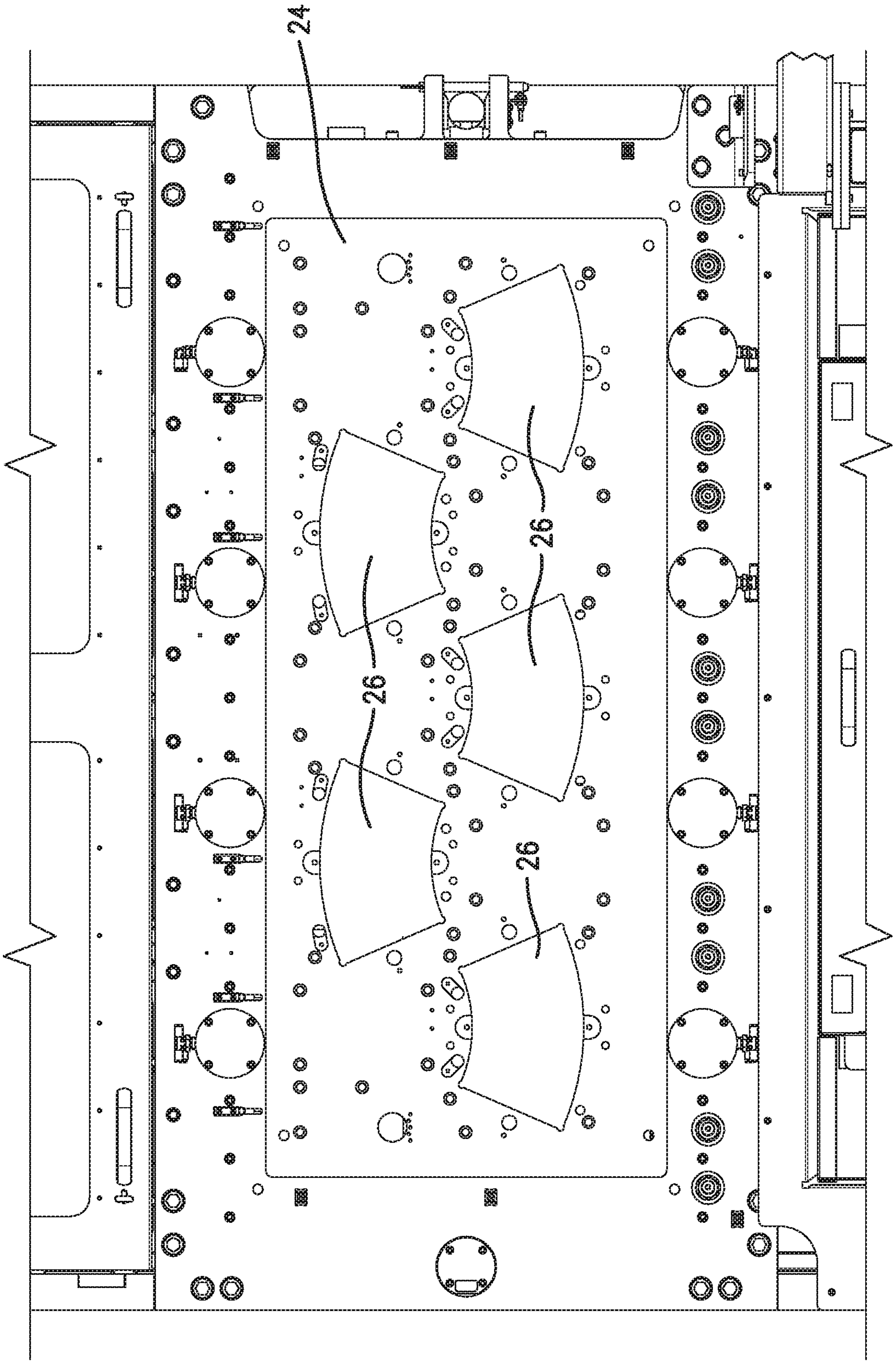
FIG. 3 is a perspective view of a cutting die of the die-cutter machine of FIG. 2.
Figure 6:
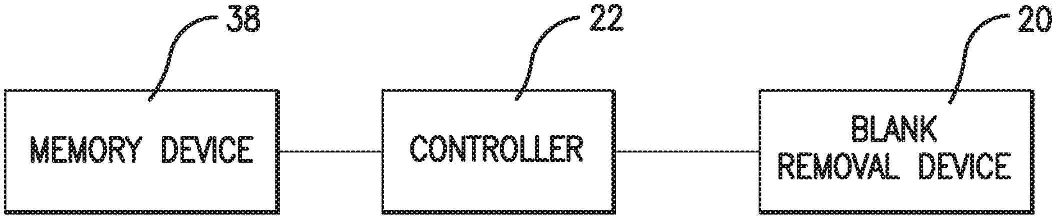
FIG. 6 is a schematic view of selected components of the system of FIG. 1.

The system 10 broadly comprises a die-cutter machine 16, a DOLA 18, a blank removal device 20, and a controller 22 (depicted in FIG. 6). The die-cutter machine 16 cuts the blanks 12 from the web 14 and outputs the blanks 12 to the DOLA 18. Turning to FIGS. 2 and 3, the die-cutter machine 16 comprises a cutting die 24 with a plurality of openings 26 through which the blanks 12 exit the machine 16 and a punch 28 for pressing the web 14 against the cutting die 24 to form the blanks 12. The punch 28 may also be operable to push the blanks 12 through the openings 26 of the cutting die 24.

Figure 4:
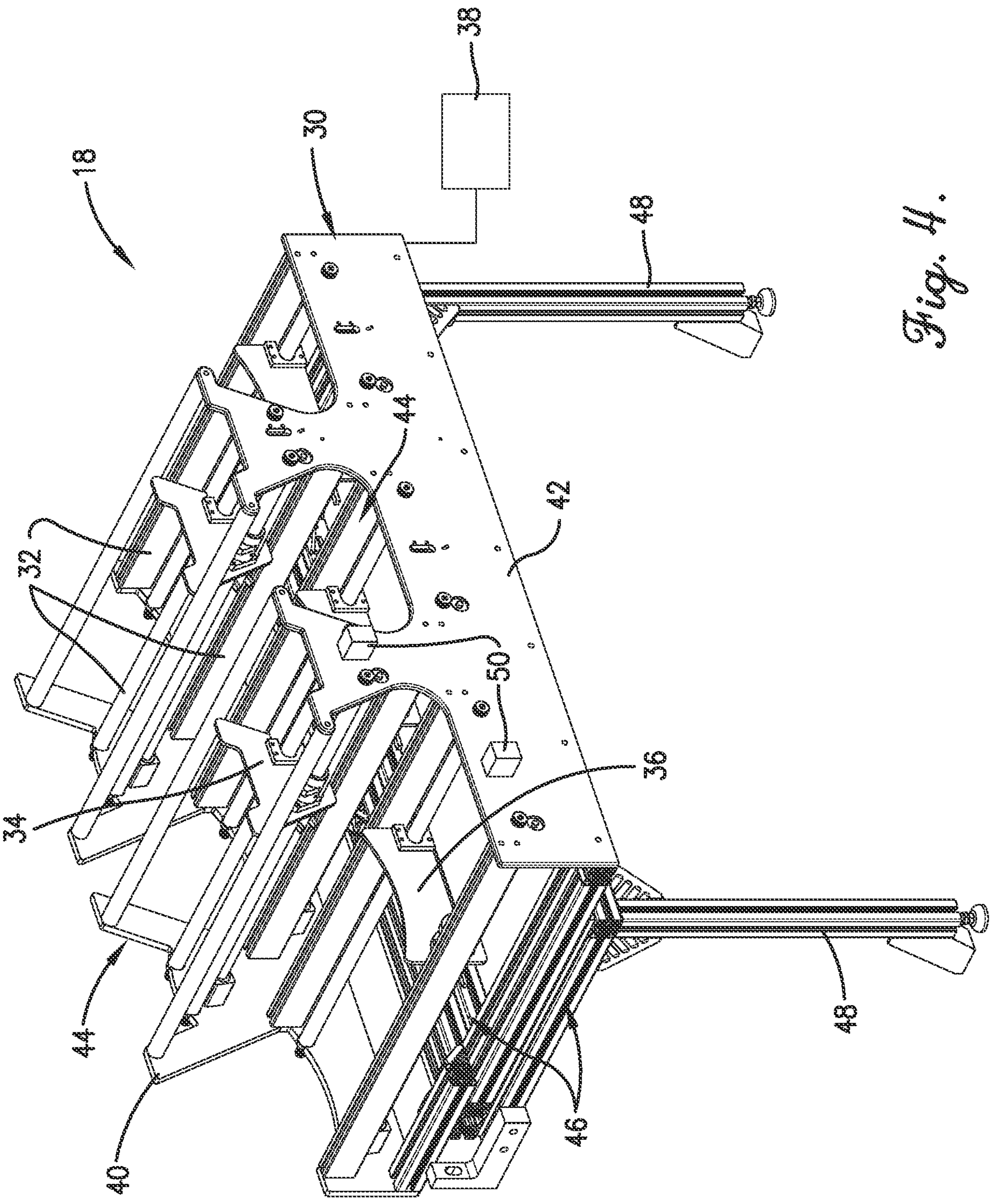
FIG. 4 is a perspective view of a blank removal device of the system of FIG. 1.

Turning to FIG. 4, the DOLA 18 receives the blanks 12 from the die-cutter machine 16 and temporarily retains the blanks 12 for removal by the blank removal device 20. The DOLA 18 may comprise a frame 30, a plurality of support structures 32, a plurality of pressure plates 34, 36, and a memory device 38 (depicted in FIG. 6). The frame 30 may include a first member, or first plate, 40 secured to the cutting die 24 and a second member, or second plate, 42 spaced apart from the first member 40 and oriented parallel to the first member 40. The support structures 32 are attached to the frame 30 and extend from the first member 40 to the second member 42 to form a plurality of lanes 44. The support structures 32 are configured to receive the blanks 12 from the openings 26 of the cutting die 24 and support the blanks 12 in a vertical orientation so that the blanks 12 form horizontal stacks in their respective lanes 44. The DOLA 18 may include a lane 44 for each opening 26 of the cutting die 24, and the lanes 44 may be coaxial with their respective opening 26.

The pressure plates 34, 36 also help support the horizontal stacks of blanks 12 in the lanes 44 and are movable within the lanes 44. The pressure plates 34, 36 may have different shapes and/or sizes based on an orientation and/or shape of the blanks 12 entering their respective lanes 44. For example, as depicted in FIG. 4, the pressure plates 34, which are used for stacks of upright blanks 12, have a different shape than the pressure plates 36, which correspond to stacks of upside-down blanks 12. The pressure plates 34, 36 may be biased toward the cutting die 24 so that the pressure plates 34, 36 maintain a pressure against the last blank 12 in the horizontal stack, thereby holding the blanks 12 in their vertical orientations. The pressure plates 34, 36 may be biased by a spring, pneumatic/hydraulic systems, and/or linear actuators.

The memory device 38 is configured to store data associated with the DOLA 18 thereon. The memory device 38 may be attached to the frame 30, support structures 32, and/or any other part of the DOLA 18. The memory device 38 may comprise any computer-readable medium for use by or in connection with an instruction execution system, apparatus, or device. In the context of this application, a "computer-readable medium" can be any physical medium that can contain, store, communicate, propagate, or transport the data for use by or in connection with the operation of any portion of the system 10. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card. The memory device 38 may include, for example, removable and non-removable memory elements such as RAM, ROM, flash, magnetic, optical, USB memory devices, MMC cards, RS MMC cards, SD cards such as microSD or miniSD, SIM cards, and/or other memory elements. In some embodiments, the memory device 38 comprises non-volatile memory, such as flash memory. In some embodiments, the memory device 38 comprises an IO-Link memory module. The data associated with the DOLA 18 stored on the memory device 38 may include recipe variables, including dimensions of the DOLA 18, dimensions of the cutting die 24, dimensions of the blanks 12, pick positions of the blank removal device 20, retraction paths of a portion of the blank removal device 20, a speed of part handling of the blank removal device 20, or placement position data for storing the blanks 12. The memory device 38 may be in communication with the controller 22 and operable to transmit the data associated with the DOLA 18 to the controller 22. For example, the memory device 38 may include an ethernet cable operable to connect to an interface through which the data may be passed to the controller 22. In some embodiments, the memory device 38 may include a wireless communication device for transmitting the data wirelessly to the controller 22.

In some embodiments, the DOLA 18 may further comprise one or more reinforcing brace 46 and legs 48 for supporting the frame 30 and one or more sensors 50 for detecting a capacity of one or more of the lanes 44. The sensors 50 may comprise, for example, laser distance measuring sensors mounted to the second member 42 of the frame 30 at the end of each lane 44. The sensors 50 may be configured to measure distances between their respective pressure plates 34, 36 and the second member 42 and/or the distances between the second member 42 and the blanks 12 at the ends of the horizontal stacks, i.e., the blanks 12 adjacent to the pressure plates 34, 36. The sensors 50 and/or the memory element 38 may then transmit one or more signals representative of the distances to the controller 22, which may use the distances to determine a capacity of each lane 44, as discussed in more detail below.

Figure 5:
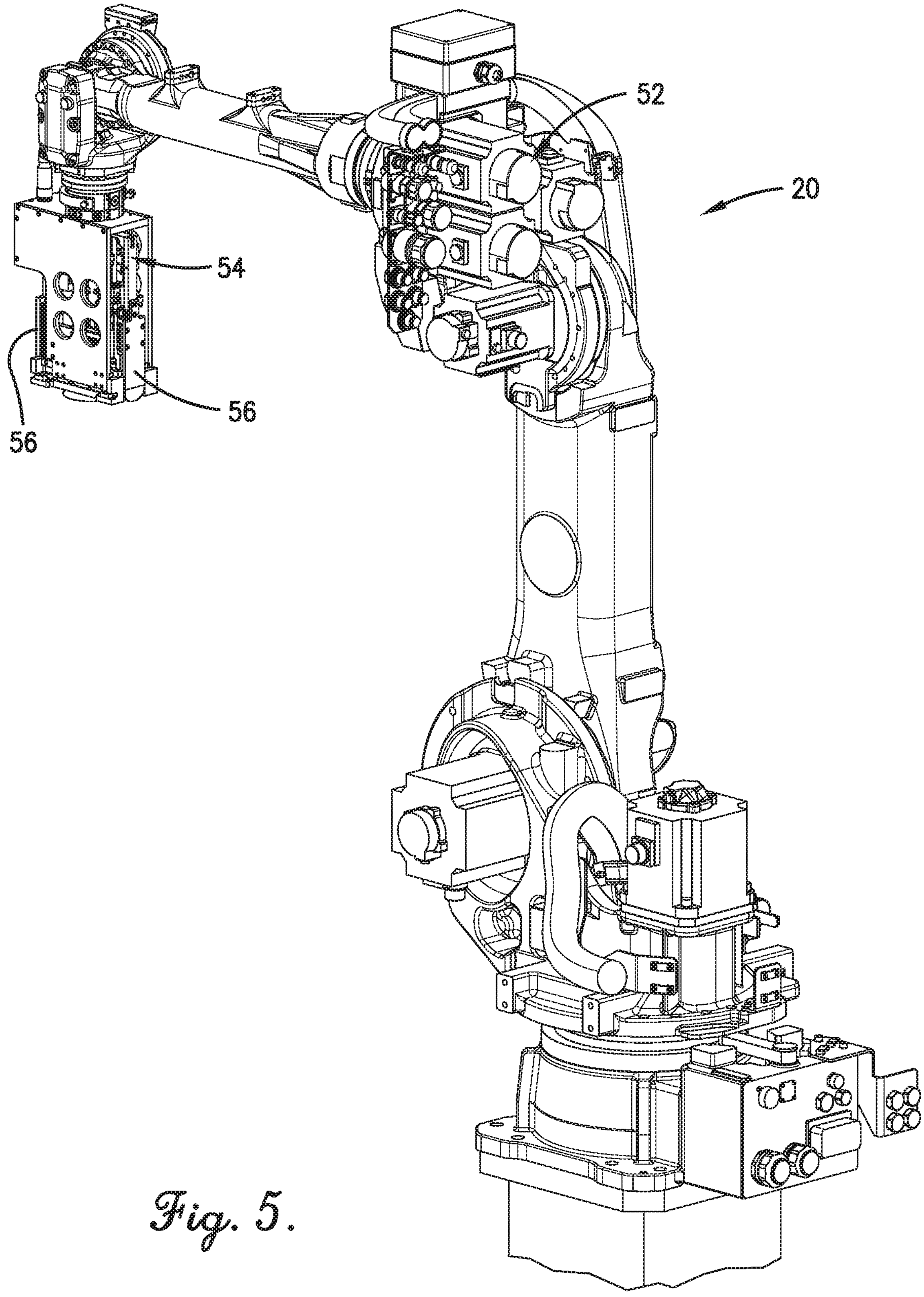
FIG. 5 is a perspective view of a die output lane assembly of the system of FIG. 1.

Turning to FIG. 5, the blank removal device 20 is configured to remove the blanks 12 from the DOLA 18. The blank removal device 20 may comprise a six-axis robot arm 52, such as the robot arm in the Axatronics C-RUSH System, and an EOAT 54. The EOAT 54 may include two or more fingers 56 for grasping the blanks 12 in the DOLA 18. The arm 52 may be operable to position the EOAT 54 into place to grasp the blanks 12 and then position the EOAT 54 and its grasped blanks 12 at a second location thereby removing some of the blanks 12.

Turning to FIG. 6, the controller 22 is configured to control the operation of the system 10. The controller 22 may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information accessed and/or generated by the system 10. For example, in some embodiments the controller 22 may comprise a plurality of controllers distributed throughout the system 10, such as a controller for the blank removal device 20, the die-cutter machine 16, etc. In some embodiments, the controller 22 may comprise a single central controller configured to control every component of the system 10. The controller 22 may control and/or sense operational sequences, power, speed, motion, or movement of actuators. Specifically, controller 22 may additionally include and/or be communicably coupled with one or more sensors, such as the sensors 50 on the DOLA 18.

The controller 22 may be configured to implement any combination of algorithms, subroutines, computer programs, or code corresponding to method steps and functions described herein. The controller 22 and computer programs described herein are merely examples of computer equipment and programs that may be used to implement the present invention and may be replaced with or supplemented with other controllers and computer programs without departing from the scope of the present invention. While certain features are described as residing in the controller 22, the invention is not so limited, and those features may be implemented elsewhere. For example, the controller 22 may be a single controller housed in the die-cutter machine 16 and/or the controller 22 may comprise a plurality of controllers distributed throughout the system 10, including a controller specifically programmed for controlling the blank removal device 20 and a controller specifically configured to control the die-cutter machine 16. For example, in embodiments where the blank removal device 20 includes its own controller, the controller on the blank removal device 20 may be trained to acquire a precise position of the blank removal device 20 relative to the die-cutter machine 16. In some embodiments, the controller of the blank removal device 20 may be configured to acquire the position of the blank removal device 20 relative to the die-cutter machine 16 within 10 millimeters. In some embodiments, the precision is 1 millimeter, and in preferred embodiments, the controller of the blank removal device 20 acquires the position of the blank removal device 20 within 0.5 millimeters.

The controller 22 may implement the computer programs and/or code segments to perform various method steps described herein. The computer programs may comprise an ordered listing of executable instructions for implementing logical functions in the controller 22. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The residential or external memory may be integral with the controller 22, stand alone memory, or a combination of both. The memory may include, for example, removable and non-removable memory elements such as RAM, ROM, flash, magnetic, optical, USB memory devices, MMC cards, RS MMC cards, SD cards such as microSD or miniSD, SIM cards, and/or other memory elements.

The controller 22 is configured to receive the data associated with the DOLA 18 and use that data to configure and/or control the blank removal device 20 and/or the die-cutter machine 16. The controller 22 may be configured to receive and/or read the data stored on the memory device 38 of the DOLA 18. The controller 22 may then use that data to configure the blank removal device 20. For example, the controller 22 may inform the blank removal device 20 of the dimensions of the DOLA 18 and the blanks 12. Thus, if the blank removal device 20 has acquired its position relative to the die-cutter machine 16, via an onboard controller, then the blank removal device 20 can determine the precise location of the DOLA 18 and the blanks 12 thereon. Further, the data may include pick positions, or the locations of (or in) the lanes 44, on the DOLA 18 where the EOAT 54 should grasp the blanks 12. The controller 22 may be configured to modify the settings of the blank removal device 20 based on the pick positions, and/or the controller 22 may control the movements of the blank removal device 20 so that the pick positions are used during operation. The data may also include retraction paths of, for example, the EOAT 54. Once the controller 22 directs the EOAT 54 to the pick position and blanks 12 are grasped by the EOAT 54, the controller 22 may direct the movements of the blank removal device 20 so that the EOAT 54 follows a particular path, depending on the lane 44 from which the blanks 12 are picked, away from the DOLA 18 and to, for example, a tote 58 (depicted in FIGS. 7-10). The data may also include placement position data for storing the blanks 12. For example, the controller 22 may configure and/or control the blank removal device 20 to position the blanks in a particular order, orientation, and/or location, etc., on the tote 58. Further, the data may include a rate at which the blank removal device 20 should remove blanks 12 from the DOLA 18.

In some embodiments, the data may include the detected capacity of the DOLA 18 based on the signals from the sensors 50, and the controller 22 may adjust one or more variables of the system 10 based on the detected capacity. For example, the controller 22 may direct the blank removal device 20 to remove more blanks 12 from a particular lane 44 that may be below an absolute threshold capacity and/or below a threshold capacity relative to the other lanes 44, i.e., the lane 44 most full of blanks 12. Further, the controller 22 may direct the blank removal device 20 to operate at a higher speed if the capacity of the lanes 44 is lower than a threshold, i.e., the lanes 44 are too full of blanks 12. Alternatively, the controller 22 may direct the blank removal device 20 to operate at a lower speed if the capacity is higher than a threshold, i.e., the lanes 44 do not have many blanks 12. Further, the controller 22 may adjust the die-cutter machine's 16 operation rate, or rate of producing blanks 12 over time, based on the capacity of one or more of the lanes 44. For example, the controller 22 may direct the die-cutter machine 16 to lower its output rate from 425 blanks per minute to 350 blanks per minute. This helps avoid having to stop the die-cutter machine 16 completely when an issue arises, which is often costly in terms of time and labor. Further, common issues of backed up lanes 44 can be readily resolved by allowing the blank removal device 20 to catch up to the die-cutter machine 16, thereby avoiding costly restart procedures.

An exemplary method of operating the system 10 will now be described. The DOLA 18 may be installed with the die-cutter machine 16 by attaching the first member 40 of the frame 30 to the cutting die 24 of the machine 16 and connecting the memory device 38 of the DOLA to the controller 22. The controller 22 may receive the data associated with the DOLA 18 and configure the blank removal device 20 accordingly. The die-cutter machine 16 may then begin operating, without having to input and/or select new recipe data or having to do test runs, by receiving the web 14 and forming blanks 12 via the punch 28 and cutting die 24.

The first set of blanks 12 may be pushed out of the openings 26 of the cutting die 24 and against the pressure plates 34, 36 of the DOLA 18 in their respective lanes 44. The next set of blanks 12 may then be pushed against the first set; thus, each set of blanks 12 exiting the openings 26 may be pushed against the previous set to form the stacks in the lanes 44.

The sensors 50 of the DOLA 18 may detect the capacity of the lanes 44 and/or the positions of the pressure plates 34, 36 to determine the capacity of the lanes 44. Signals representative of the capacity of the lanes 44 may be sent to the controller 22.

Figure 7:
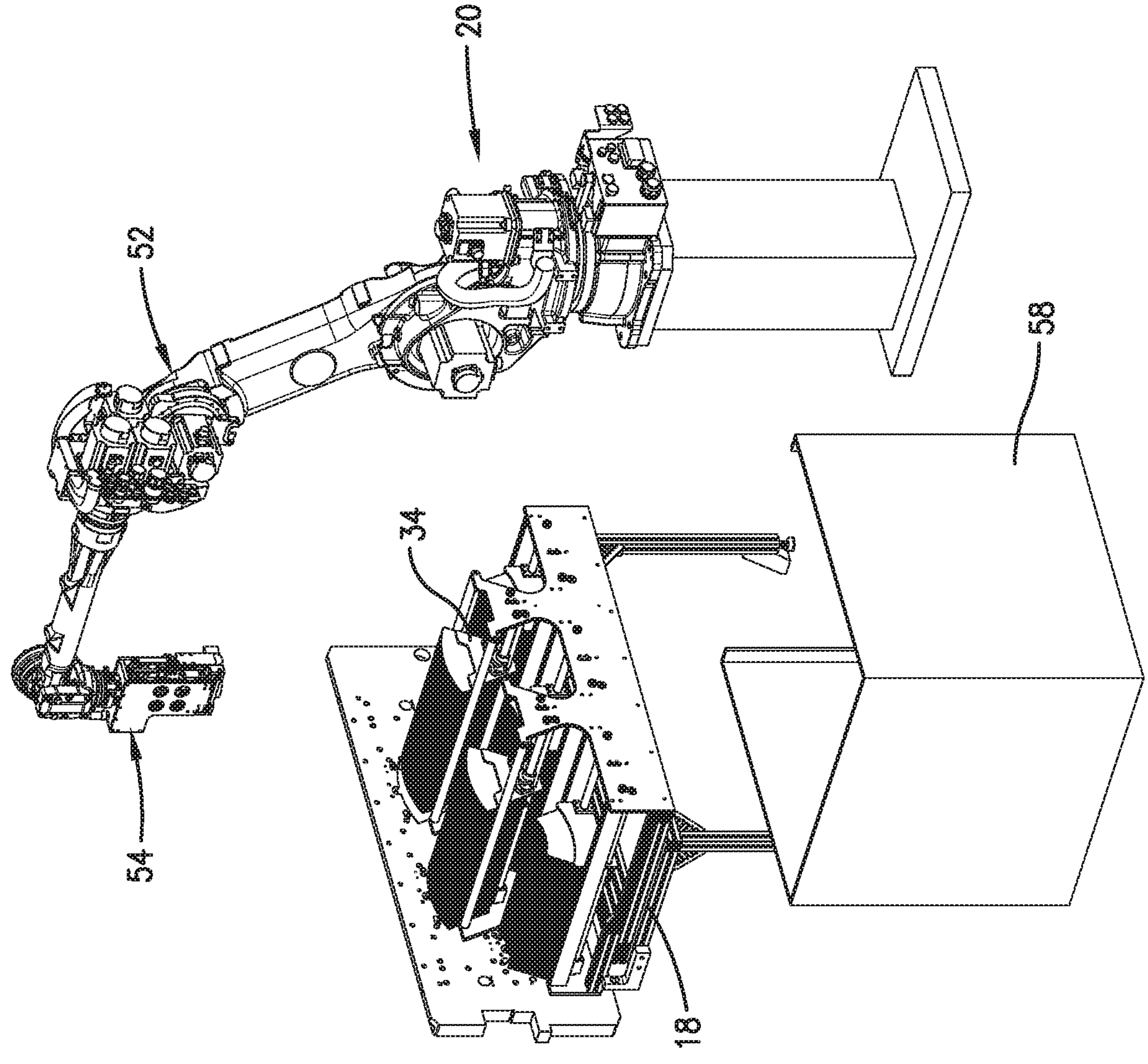
FIG. 7 is a perspective view of the system of FIG. 1 in operation.
Figure 8:
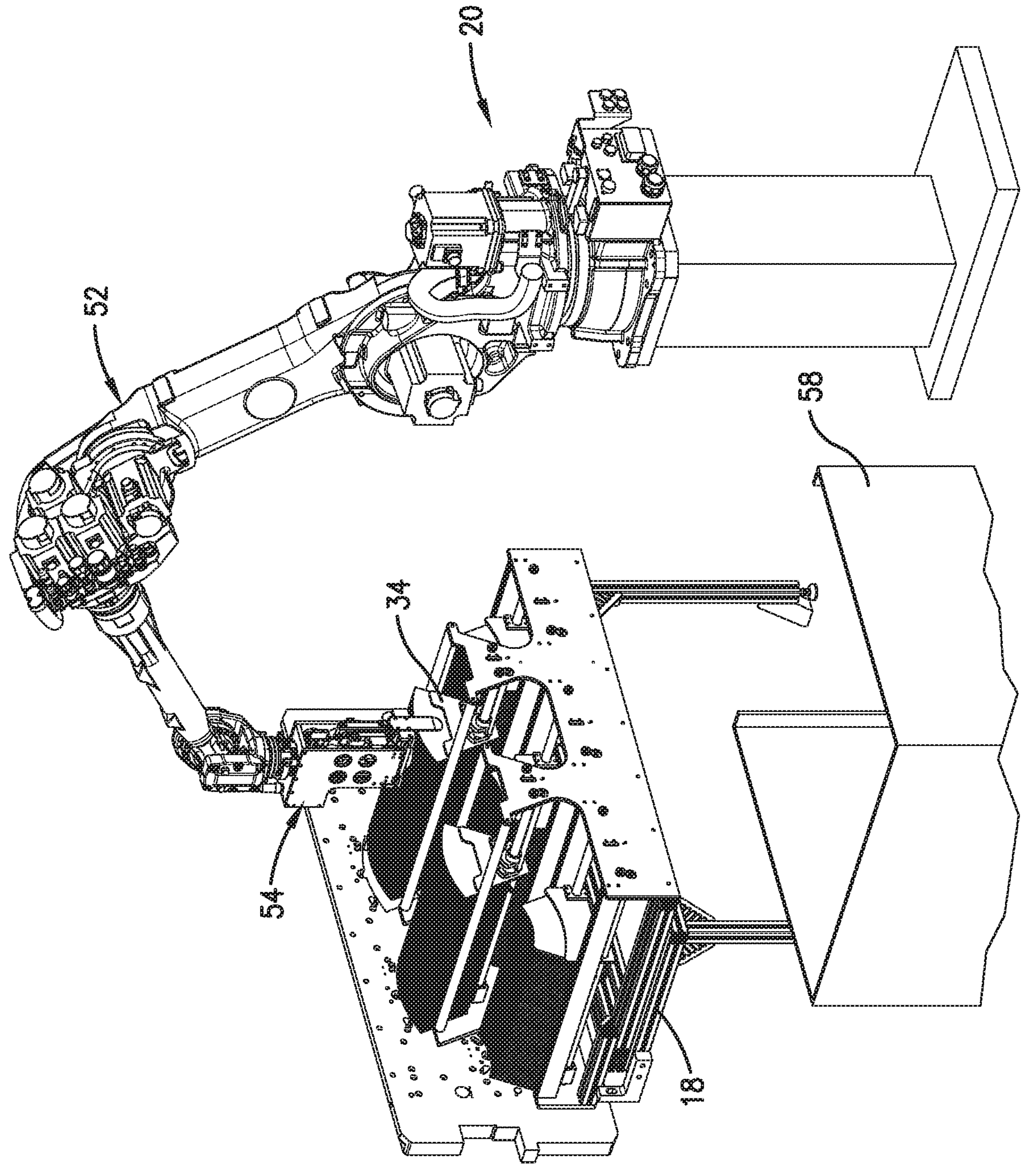
FIG. 8 is a perspective view of the system of FIG. 1 with the blank removal device removing blanks from a lane of the die output lane assembly.
Figure 9:
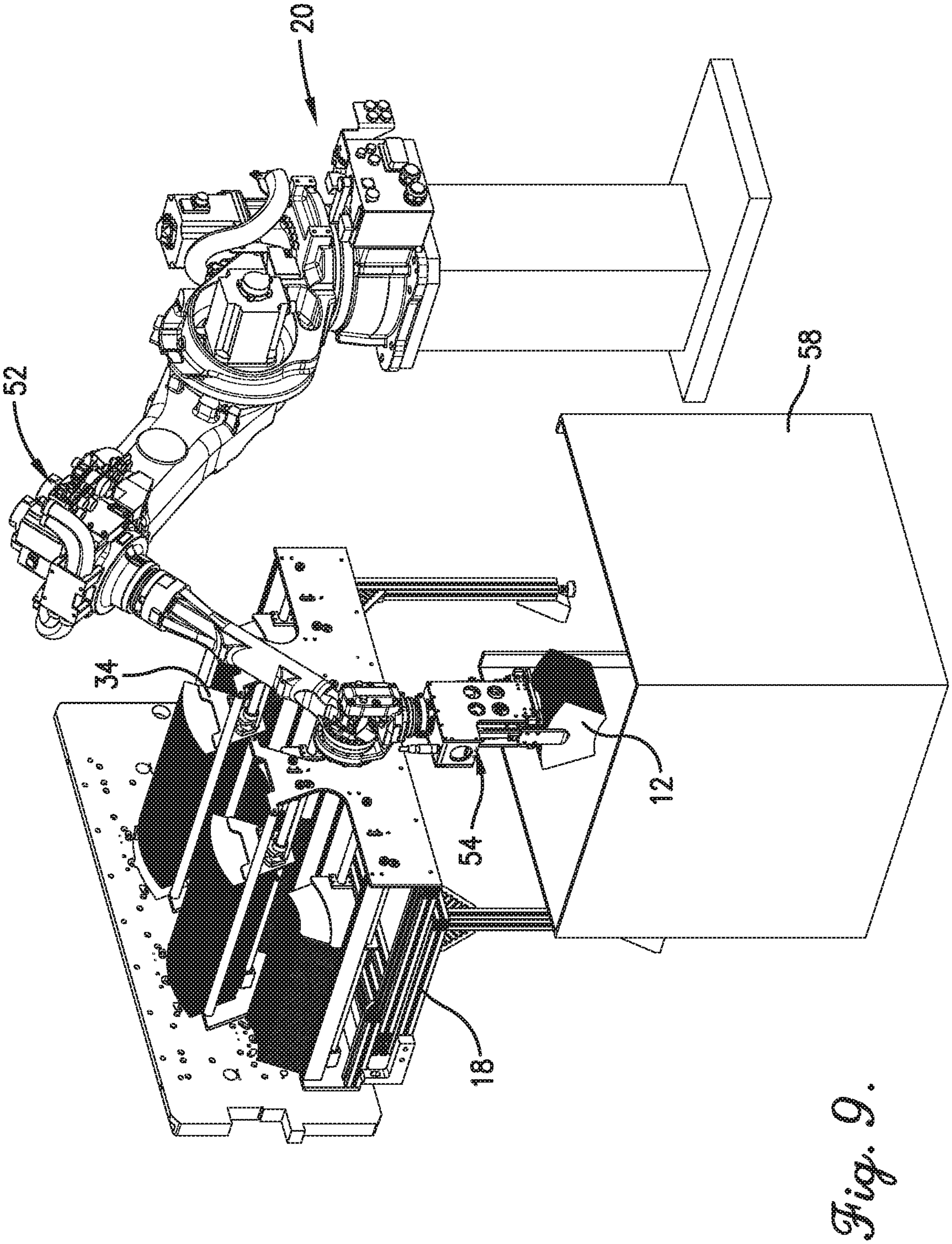
FIG. 9 is a perspective view of the system of FIG. 1 with the blank removal device placing blanks in a tote.
Figure 10:
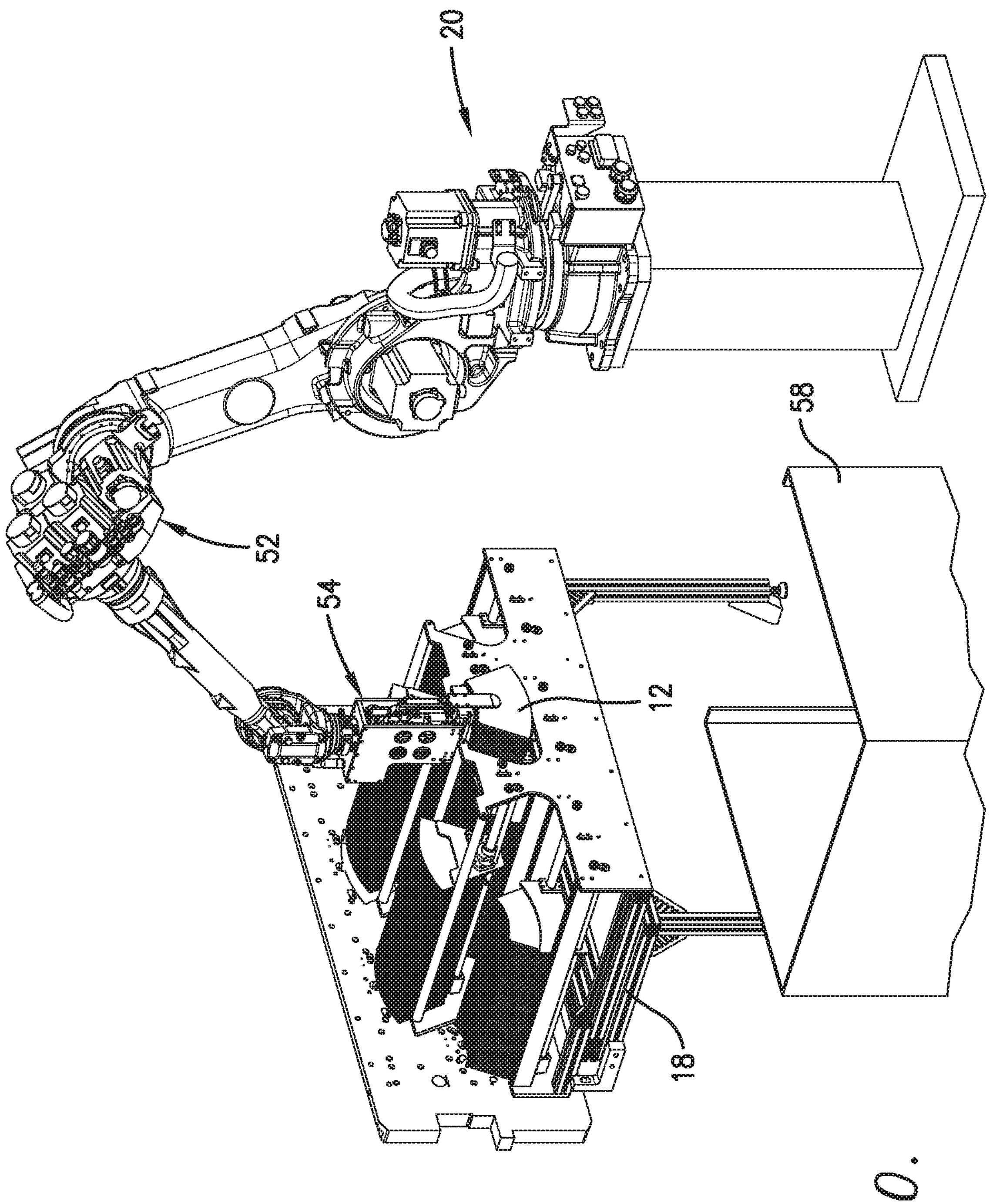
FIG. 10 is a perspective view of the system of FIG. 1 with the blank removal device removing blanks from a different lane of the die output lane assembly.

The controller 22 may direct the blank removal device 20 to remove blanks 12 from the DOLA 18. The controller 22 may detect that the lanes 44 have reached a certain capacity and consequently direct the blank removal device 20 to begin removing blanks 12 from the lanes 44 based on the data associated with the DOLA 18 received from the memory device 38 of the DOLA 18. As depicted in FIG. 7, the controller 22 may direct the blank removal device 20 to actuate its arm 52 so that the EOAT 54 is positioned over the DOLA 18. The controller 22 may then direct the blank removal device 20 to actuate its arm 52 so that the EOAT 54 is located at a pick position with its fingers 56 engaging a plurality of the blanks 12, as depicted in FIG. 8. The controller 22 may direct the blank removal device 20 to lift the engaged blanks 12 out of the lane 44 according to a retraction path associated with that lane, as depicted in FIG. 9. The pressure plate 34 associated with the lane 44 from which the blanks 12 were removed may be biased so that it shifts horizontally to maintain the blanks 12 in the lane 44 in their vertical orientation. The controller 22 may direct the blank removal device 20 to place the blanks 12 held in the EOAT 54 in the tote 58 according to the placement position data from the DOLA 18. The controller 22 may then direct the blank removal device 20 to repeat this for a different lane 44, as depicted in FIG. 10.

If the controller 22 detects that the one or more of the lanes 44 have too many or too few blanks 12 based on the data from the sensor 50, the controller 22 may direct the die-cutter machine 16 output rate and/or the speed of operation of the blank removal device 20.

Once a desired number of blanks 12 have been produced, the cutting die 24 and the DOLA 18 may be swapped out with a different cutting die 24 and DOLA 18. The data associated with the new DOLA 18 may be stored on a memory device 38 on the new DOLA 18 and uploaded to the controller 22 so that the die-cutter machine 16 and blank removal device 20 can begin operating without having to input new recipe data into the system 10 and/or selecting new recipe data.

Figure 11:
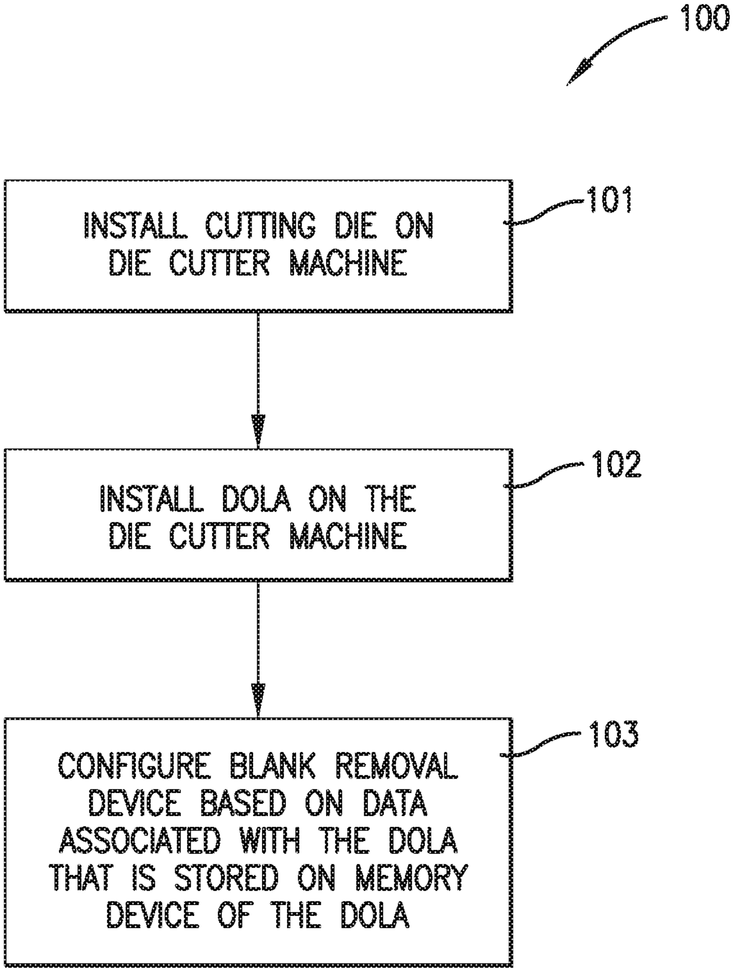
FIG. 11 is a flowchart illustrating at least a portion of the steps for installing a die output lane assembly according to an embodiment of the present invention.

The flow chart of FIG. 11 depicts the steps of an exemplary method 100 of installing a DOLA. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-10. However, some of such actions may be distributed differently among such devices or other devices without departing from the spirit of the present invention.

Referring to step 101, a cutting die is installed on a die-cutter machine. The cutting die may have any number of openings for forming the blanks. The cutting die may be positioned vertically so that blanks are formed vertically and pushed horizontally out of the openings.

Referring to step 102, a DOLA is installed on the die-cutter machine. The DOLA may include a frame member that is directly secured to a surface of the cutting die. A memory device of the DOLA may be connected to a controller for sending data associated with the DOLA to the controller. The data may include dimensions of the DOLA, dimensions of the cutting die, dimensions of the blanks, pick positions of a blank removal device, retraction paths of a portion of the blank removal device, a speed of part handling of the blank removal device, and/or placement position data for storing the blanks.

Referring to step 103, the blank removal device is configured based on the data associated with the DOLA. The controller may configure itself and/or a controller of the blank removal device based on the data. This enables the efficient swapping out of different DOLAs without having to input or select new recipe data.

The method 100 may include additional, less, or alternate steps and/or device(s), including those discussed elsewhere herein. For example, in some embodiments, the blank removal device may be configured, programmed, and/or trained to acquire its position relative to the die-cutter machine. Further, in some embodiments, a new DOLA with different data associated therewith (and stored on a memory device of the new DOLA) may be installed on the die-cutter machine.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for installing a die output lane assembly, the method comprising:
- securing the die output lane assembly adjacent to a paper cutting die of a paper die-cutter machine, the die output lane assembly comprising:
  - a frame,
  - a plurality of support structures attached to the frame to form a plurality of lanes, the support structures operable to receive sidewalls from openings of the cutting die, and
  - a memory device secured to the frame and having stored thereon data associated with the die output lane assembly;
- transmitting data associated with the die output lane assembly from the memory device of the die output lane assembly to a controller of a robot that is remote from the die output lane assembly, wherein the data comprises a dimension of the die output lane assembly, a dimension of a cutting die of the die-cutter machine, a dimension of a blank, a pick position for removing the blank, a retraction path for removing the blank, a speed of part handling, and placement position data for storing the blank; and
- receiving, via the controller of the robot, the data from the die output lane assembly.

2. The method of claim 1, further comprising determining, via the controller of the robot, a position of a blank removal device relative to the die-cutter machine.

3. The method of claim 1, further comprising configuring, via the controller of the robot, a removal path of the robot based on the data associated with the die output lane assembly for each of the plurality of lanes.

* * * * *